(No Model.)
D. WELLINGTON.
CAR COUPLING.
No. 395,369. Patented Jan. 1, 1889.
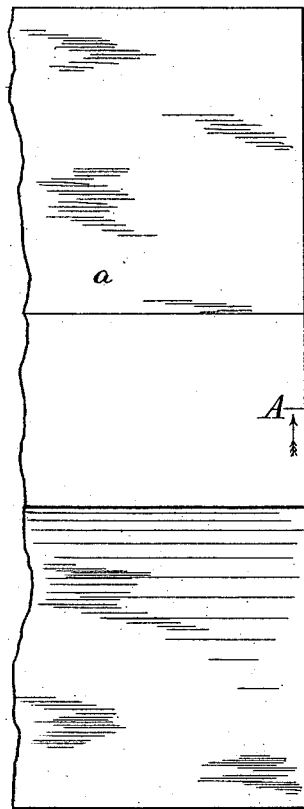
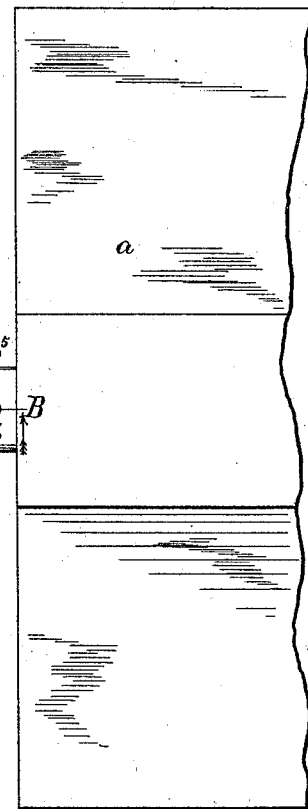
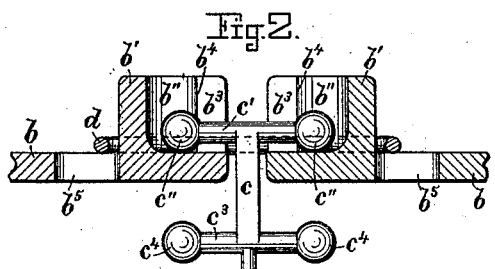
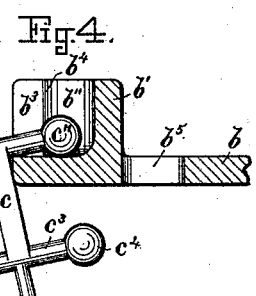
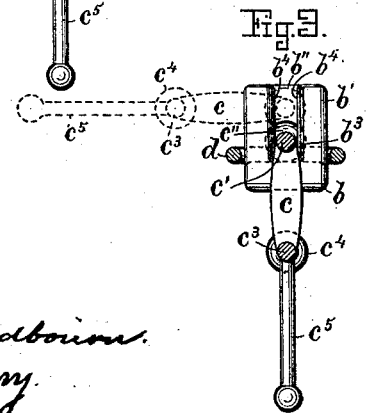
Witnesses
Henry Chadbourne.
Osborne A. Perry.
Inventor
Darius Wellington
by Alban Andrén
his atty.

UNITED STATES PATENT OFFICE.

DARIUS WELLINGTON, OF BOSTON, MASSACHUSETTS.

CAR-COUPLING.

SPECIFICATION forming part of Letters Patent No. 395,369, dated January 1, 1889.

Application filed January 9, 1888. Serial No. 260,132. (No model.)

*To all whom it may concern:*

Be it known that I, DARIUS WELLINGTON, a citizen of the United States, and a resident of Boston, in the county of Suffolk and State of Massachusetts, have invented new and useful Improvements in Car-Couplings, of which the following, taken in connection with the accompanying drawings, is a specification.

This invention relates to improvements in car-couplings for freight or passenger cars, and it is carried out as follows, reference being had to the accompanying drawings, wherein—

Figure 1 represents a plan view of the improved car-coupler, showing the ends of a pair of cars as coupled together. Fig. 2 represents a longitudinal section on the line A B, shown in Fig 1. Fig. 3 represents a cross-section on the line C D, also shown in Fig. 1; and Fig. 4 represents a side view of the coupler, shown as suspended from one of the draw-bars.

Similar letters refer to similar parts wherever they occur on the different parts of the drawings.

$a\ a$ represent a pair of railroad-cars of any well-known construction, to each of which is connected or secured in a suitable manner a draw-bar, $b$, having a head, $b'$, in its outer end, as shown in the drawings.

Each draw-bar is provided with a pocket, $b''$, having a flaring end opening, $b^3$, as shown, the rear portion of which is contracted in the form of inwardly-projecting lips $b^4\ b^4$, for a purpose as will hereinafter be described.

The detachable coupler is made of wrought metal, and is composed of a bar, $c$, having in its upper end a cross-piece, $c'$, of sufficient size to be readily introduced in the flaring mouth-pieces or openings $b^3\ b^3$, said bar terminating in its ends as balls or projections $c''\ c''$, each one being of a size to permit its being readily introduced into the pocket $b''$ of the draw-bar head, and so that the lips $b^4\ b^4$ shall serve as stops to prevent the ball or projection $c''$ from being drawn horizontally out of the said pocket $b''$ when the coupler is laid in the recessed draw-bar heads, as shown in Figs. 1, 2, and 3.

While connecting the coupler to the draw-bars it is held by the operator in a horizontal position, as shown by dotted lines in Fig. 3, and after the balls or projections $c''\ c''$ have been introduced in the pockets $b''\ b''$ of the draw-bar heads the lower end of the bar or lever $c$ is allowed to swing downward by its own gravity to the vertical position shown in Figs. 1, 2, and 3.

The bar or lever $c$ has another horizontal cross-piece, $c^3$, located on said lever $c$ at a distance below the upper cross-piece, $c'$, sufficiently to serve as a stop against the under side of the draw-bar heads, to prevent the upper cross-piece and its end projections from jumping out of the pockets $b''\ b''$ while the cars are in motion. Said cross-piece $c^3$ has its ends preferably provided with balls or projections $c^4\ c^4$, similar in form and size to the upper projections, $c''\ c''$, as shown in the drawings, so that if the upper cross-piece, $c'$, or any of its coupling projections should accidentally become broken the coupler can be reversed by placing the lower projections, $c^4\ c^4$, in the pockets $b''\ b''$, and allowing the cross-piece $c'$ and its projections $c''\ c''$ to hang downward. Below the lower cross-piece, $c^3$, the arm or lever $c$ is extended, to serve as a handle, $c^5$, of suitable length to enable the operator to easily manipulate the coupler without going between the cars. When the cars are uncoupled, the coupler is suspended from and made to rest in the pocket of one of the draw-bar heads, as shown in Fig. 4.

When it is desired to couple a pair of cars together after the ends of their draw-bar heads have been brought nearly together, as shown in Figs. 1 and 2, the brakeman takes hold of the handle or extension $c^5$ and holds the coupler in a horizontal position, and introduces the projections $c''\ c''$ in the pockets $b''\ b''$, as shown in dotted lines in Fig. 3, after which he lets go the handle $c^5$, when the coupler will be connected to the draw-bar heads, and by its own gravity cause the lever $c$ and its handle or extension $c^5$ to swing into a perpendicular position, as shown in Figs. 1, 2, and 3, in which position the coupler cannot be disconnected from the draw-bar heads, on account of the lower cross-piece, $c^3$, as above set forth. To uncouple the device, it is only needed to swing the coupler into the horizontal position shown in dotted lines in Fig. 3, when one or both ends of the cross-piece $c'$ may be detached from the respective pockets on the draw-bar heads, as may be desired.

As a further security against the accidental uncoupling of the device, I inclose the draw-bar heads by means of a wrought-metal link, $d$, adapted to rest loosely on the draw-bars back of the respective heads $b'\ b'$, as shown in Figs. 1, 2, and 3; but said link may, however, be dispensed with, if so desired, without departing from the essence of my invention. For the purpose of enabling said link $d$ to be easily lifted away from the draw-bars, as may be desired, previous to uncoupling the cars, I make slotted perforations $b^5\ b^5$ through the draw-bars back of their heads $b'\ b'$, as shown in Figs. 1 and 2, through which a suitable hook may be introduced from above for the purpose of lifting the link $d$ away from the said draw-bars.

What I wish to secure by Letters Patent, and claim, is—

1. The draw-bars $b\ b$, having pocketed heads, as described, combined with the cross-piece $c'$ and end projections, $c''\ c''$, thereon, the arm or lever $c$ on said cross-piece, and the lower cross-piece, $c^3$, adapted to serve as a stop against the under side of the draw-bars to prevent the accidental uncoupling of the device, as set forth.

2. The draw-bars $b\ b$, having pocketed heads, as described, and the coupler composed of an arm or lever having one or more cross-pieces and end projections adapted to rest in the pocketed draw-bar heads, combined with the safety-link $d$, adapted to encompass the draw-bar heads, substantially in the manner and for the purpose set forth.

In testimony whereof I have signed my name to this specification, in the presence of two subscribing witnesses, on this 5th day of January, A. D. 1888.

DARIUS WELLINGTON.

Witnesses:
ALBAN ANDRÉN,
HENRY CHADBOURN.